(12) United States Patent
Hirata et al.

(10) Patent No.: US 12,280,695 B2
(45) Date of Patent: Apr. 22, 2025

(54) POSITION CONTROLLING DEVICE

(71) Applicant: TOYOTA BOSHOKU KABUSHIKI KAISHA, Aichi-ken (JP)

(72) Inventors: Kazuyuki Hirata, Toyota (JP); Shigetomi Honda, Nagoya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 247 days.

(21) Appl. No.: 17/983,573

(22) Filed: Nov. 9, 2022

(65) Prior Publication Data

US 2023/0158923 A1    May 25, 2023

(30) Foreign Application Priority Data

Nov. 11, 2021    (JP) .................................. 2021-183963

(51) Int. Cl.
*B60N 2/02*    (2006.01)
*B60N 2/10*    (2006.01)
*B60N 2/14*    (2006.01)

(52) U.S. Cl.
CPC .............. *B60N 2/0244* (2013.01); *B60N 2/10* (2013.01); *B60N 2/14* (2013.01)

(58) Field of Classification Search
CPC .......... B60N 2/0244; B60N 2/10; B60N 2/14; B60N 2/02246; B60N 2/02253; B60N 2/0268; B60N 2002/0204; B60N 2/39; B60N 2/502; B60N 2/544

See application file for complete search history.

(56) References Cited

U.S. PATENT DOCUMENTS

2019/0381914 A1* 12/2019 Kaneko ................ B60N 2/0244
2021/0291702 A1* 9/2021 Takeda ..................... B60N 2/06

FOREIGN PATENT DOCUMENTS

| DE | 102016009452 | | 2/2018 |
| DE | 102018222635 | | 6/2020 |
| GB | 2438826 | | 12/2007 |
| JP | 2003169725 A | * | 6/2003 |
| JP | 2003169730 A | * | 6/2003 |
| JP | 2006-199118 | | 8/2006 |

(Continued)

OTHER PUBLICATIONS

German Office Action issued in German Patent Application No. 10 2022 129 422.6, dated Aug. 2, 2023, together with English translation thereof.

*Primary Examiner* — Mary Cheung
(74) *Attorney, Agent, or Firm* — Greenblum & Bernstein, P.L.C.

(57) ABSTRACT

A position controlling device controls the position of a loading platform. The loading platform includes a loading portion, a base portion, and a coupling portion. The base portion is provided below the loading portion in a manner of supporting the loading portion. The coupling portion couples the base portion and the loading portion with a restoring member between them. One of the upper part of the base portion and the lower part of the loading portion includes a spherical surface that is convex downward. The other one of the upper part of the base portion and the lower part of the loading portion includes a guide portion. The guide portion guides the base portion and the loading portion such that the base portion and the loading portion are movable relative to each other in a direction along the spherical surface.

8 Claims, 7 Drawing Sheets

(56) References Cited

FOREIGN PATENT DOCUMENTS

| JP | 2014121974 A | * | 7/2014 |
| JP | 2021-146831 | | 9/2021 |
| KR | 10-0589431 | | 6/2006 |

* cited by examiner

POSITION CONTROLLING DEVICE

BACKGROUND ART

The present disclosure relates to a position controlling device that controls the position of a loading platform provided in a mobile object.

A vehicle such as an automobile typically includes a seat configured to allow an occupant to sit thereon. A vehicle seat includes a backrest portion, against which an occupant rests their back, and a seat portion, on which the occupant sits down. A vehicle seat has a function of changing the angle of the backrest portion, a function of changing the angle of the seat portion, and the like (see Japanese Laid-Open Patent Publication No. 2021-146831). In a vehicle, it is possible to set the position of a seat and, thus, the seated position of an occupant, in accordance with the preference of the occupant or the use situation of the vehicle.

As vehicles incorporate advanced features, vehicle seats are also desired to incorporate advanced features, so as to improve ride comfort. Advanced features are desired to be incorporated into not only position controlling devices that control the position of a vehicle seat, but also a position controlling device that controls the position of a loading platform provided in a mobile object, such as a position controlling device that controls the position of a loading platform provided in an automatic guided vehicle.

SUMMARY OF THE DISCLOSURE

In a general aspect, a position controlling device is configured to control a position of a loading platform provided in a mobile object. The loading platform includes a loading portion that includes a portion capable of being loaded with a loaded object, a base portion that is provided below the loading portion in a manner of supporting the loading portion, and a coupling portion that includes a restoring member. The restoring member generates a restoring force for restoring the coupling portion to its original length when the coupling portion is extended. The coupling portion couples the base portion and the loading portion to each other with the restoring member between the base portion and the loading portion. The loading portion and the base portion are provided such that a lower part of the loading portion and an upper part of the base portion face each other. One of the upper part of the base portion and the lower part of the loading portion includes a spherical surface that is convex downward, and the other one of the upper part of the base portion and the lower part of the loading portion includes a guide portion. The guide portion guides the base portion and the loading portion such that the base portion and the loading portion are movable relative to each other in a direction along the spherical surface.

BRIEF DESCRIPTION OF DRAWINGS

The features of the present disclosure that are believed to be novel are set forth with particularity in the appended claims. The disclosure, together with objects and advantages thereof, may best be understood by reference to the following description of the presently preferred embodiments together with the accompanying drawings in which:

DESCRIPTION OF THE PREFERRED EMBODIMENTS

First Embodiment

A position controlling device according to a first embodiment will now be described with reference to FIGS. 1 to 5.
Vehicle 20

Figure 1:
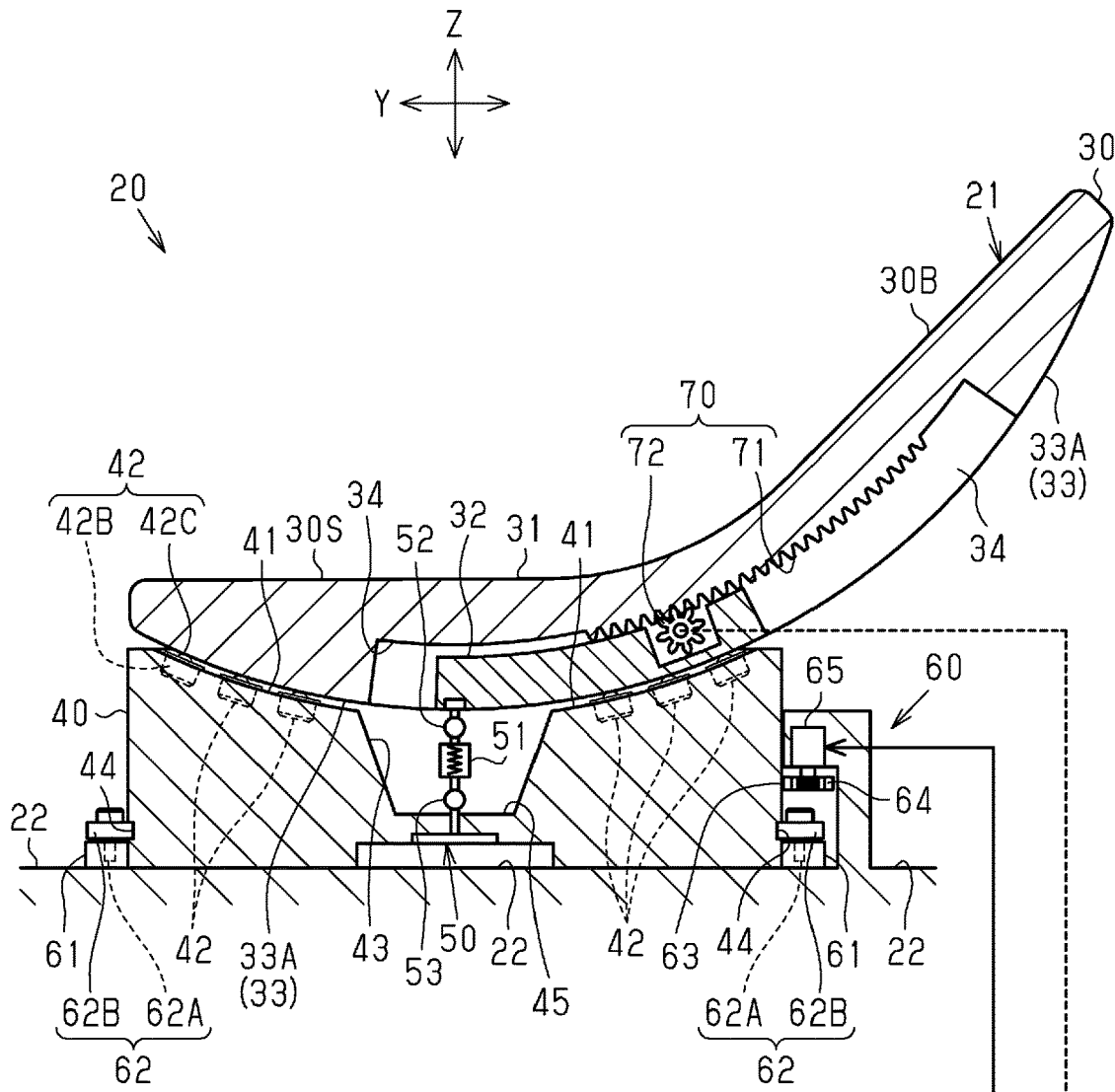
FIG. 1 is a schematic diagram showing a position controlling device according to a first embodiment.
Figure 1:
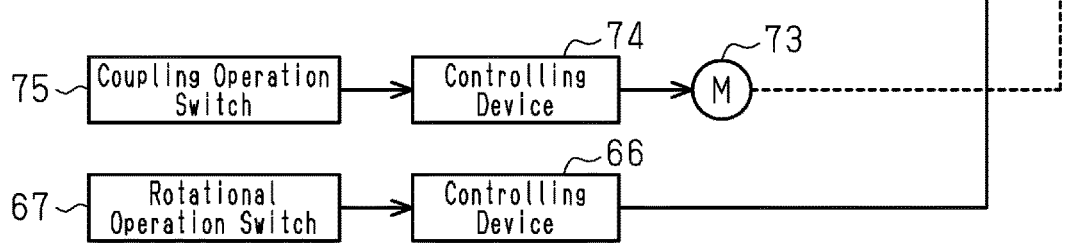

As shown in FIG. 1, a vehicle 20 includes a seat 21 configured to allow an occupant to sit thereon. The seat 21 is attached to a vehicle body 22. In the present embodiment, the vehicle 20 corresponds to a mobile object, the seat 21 corresponds to a loading platform, the vehicle body 22 corresponds to a main body of the mobile object, and an occupant corresponds to a loaded object.

The seat 21 includes a loading portion 30, on which an occupant is seated, and a base portion 40, which supports the loading portion 30 from below.
Loading Portion 30

Figure 2:
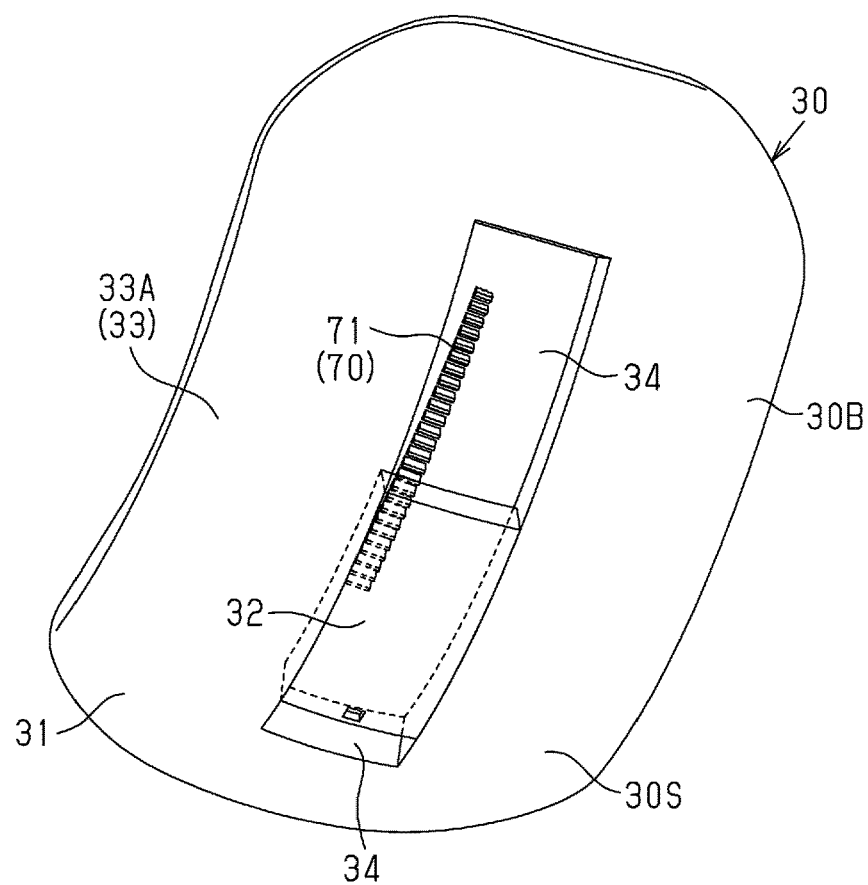
FIG. 2 is a perspective view from obliquely below, showing a loading portion according to the first embodiment.

As shown in FIGS. 1 and 2, the loading portion 30 includes a seat portion 30S, on which the occupant sits down, and a backrest portion 30B, against which the occupant rests their back. The loading portion 30 has a structure in which the seat portion 30S and the backrest portion 30B are formed integrally.

The loading portion 30 includes a lower convex portion 33. The lower convex portion 33 includes a lower part of the seat portion 30S and a back part of the backrest portion 30B. An outer surface (hereinafter, referred to as a support surface 33A) of the lower convex portion 33 has a shape protruding in a direction away from the occupant seated on the loading portion 30, that is, a shape bulging downward. In the present embodiment, the support surface 33A of the lower convex portion 33 corresponds to a surface supported by the base portion 40. Substantially the entire support surface 33A forms a spherical surface that is convex downward in a direction away from the occupant seated on the loading portion 30.

Base Portion 40

Figure 3:
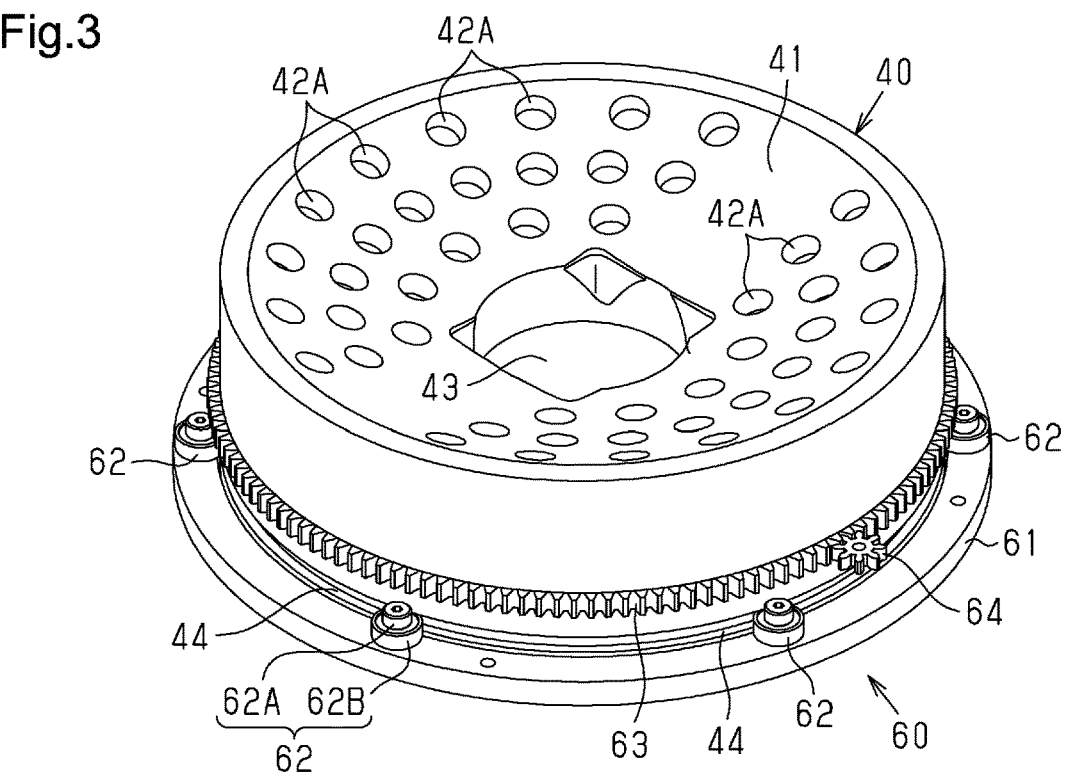
FIG. 3 is a perspective view from obliquely above, showing a base portion according to the first embodiment.

As shown in FIGS. 1 and 3, the base portion 40 is attached to the vehicle body 22. The base portion 40 has a substantially columnar outer surface extending in an up-down direction Z of the vehicle 20. The base portion 40 includes, at the upper end, an upper concave portion 41, which is concave downward. The inner surface of the upper concave portion 41 is substantially spherical.

The upper concave portion 41 is provided with multiple (in the present embodiment, forty-six) guide portions 42, which guide the base portion 40 and the loading portion 30 to allow the base portion 40 and the loading portion 30 to be movable relative to each other. The guide portions 42 are arranged at intervals in directions along the support surface 33A of the loading portion 30, which has a spherical surface. FIG. 3 shows the base portion 40 in a state in which the guide portions 42 are yet to be attached. As shown in FIG. 3, the upper concave portion 41 includes attachment holes 42A. The guide portions 42 (FIG. 1) are attached to the attachment holes 42A.

As shown in FIG. 1, each guide portion 42 includes a case 42B and a contact ball 42C. The cases 42B are supported by the support surface 33A of the upper concave portion 41. Each contact ball 42C has a spherical shape in contact with the support surface 33A of the lower convex portion 33, and is rotatably accommodated in the corresponding case 42B. Freebears (registered trademark) may be used as the guide portions 42. The guide portions 42 are evenly arranged at intervals on the entire inner surface of the upper concave portion 41.

In the present embodiment, when the loading portion 30 is supported by the base portion 40 (the state shown in FIG. 1), the contact balls 42C of the guide portions 42 provided in the upper concave portion 41 of the base portion 40 come into contact with the support surface 33A of the lower convex portion 33 of the loading portion 30. In the present embodiment, the guide portions 42 allow base portion 40 and the loading portion 30 to move relative to each other in directions along the support surface 33A of the loading portion 30, which has a spherical surface.

Coupling Portion 50

A coupling portion 50, which is attached to the seat 21, couples the base portion 40 and the loading portion 30 to each other. The coupling portion 50 extends in a first direction (in the present embodiment, the up-down direction Z), which is a direction in which the loading portion 30 and the base portion 40 are arranged. The base portion 40 includes a coupling recess 43 in a center in plan view. The coupling recess 43 extends in the up-down direction Z from the upper end to the vicinity of the lower end of the base portion 40. The coupling portion 50 is arranged inside the coupling recess 43. The coupling portion 50 includes a spring portion 51, an upper coupling portion 52, and a lower coupling portion 53.

Spring Portion 51

The spring portion 51 is a middle part in the up-down direction Z of the coupling portion 50. The spring portion 51 incorporates a compression coil spring. The axis of the compression coil spring extends in the up-down direction Z. The spring portion 51 is configured to extend and contract in the up-down direction Z. The spring portion 51 has a structure in which the compression coil spring therein is elastically deformed in a compression direction when the spring portion 51 is extended. In the present embodiment, the spring portion 51 corresponds to a restoring member that generates a restoring force for restoring the coupling portion 50 to its original length when the coupling portion 50 is extended.

Upper Coupling Portion 52

The upper coupling portion 52 is a part (specifically, an upper part) of the coupling portion 50 at the side closer to the loading portion 30 in the up-down direction Z. The upper coupling portion 52 is provided between the loading portion 30 and the spring portion 51 so as to connect the loading portion 30 and the upper part of the spring portion 51. The upper coupling portion 52 has a function of a universal joint.

Lower Coupling Portion 53

The lower coupling portion 53 is a part (specifically, a lower part) of the coupling portion 50 at the side closer to the base portion 40 in the up-down direction Z. The lower coupling portion 53 is provided between the base portion 40 and the spring portion 51 so as to couple the base portion 40 (specifically, a bottom wall 45 of the coupling recess 43) and the lower end of the spring portion 51. The lower coupling portion 53 has a function of a universal joint.

Operation of Coupling Portion 50

When the vehicle 20 travels, an inertial force acts on the seat 21 of the vehicle 20 and the occupant seated on the seat 21 as the vehicle 20 accelerates, decelerates, turns, or travels on a bumpy road. In such cases, the guide portions 42 in the seat 21 of the present embodiment allow for relative movement between the loading portion 30 and the base portion 40 of the seat 21. In addition, when the loading portion 30 and the base portion 40 move relative to each other in the seat 21 of the present embodiment, the spring portion 51 of the coupling portion 50 extends or contracts so that the compression coil spring in the spring portion 51 is elastically deformed. This attenuates the inertial force acting on the loading portion 30 of the seat 21.

Figure 4:
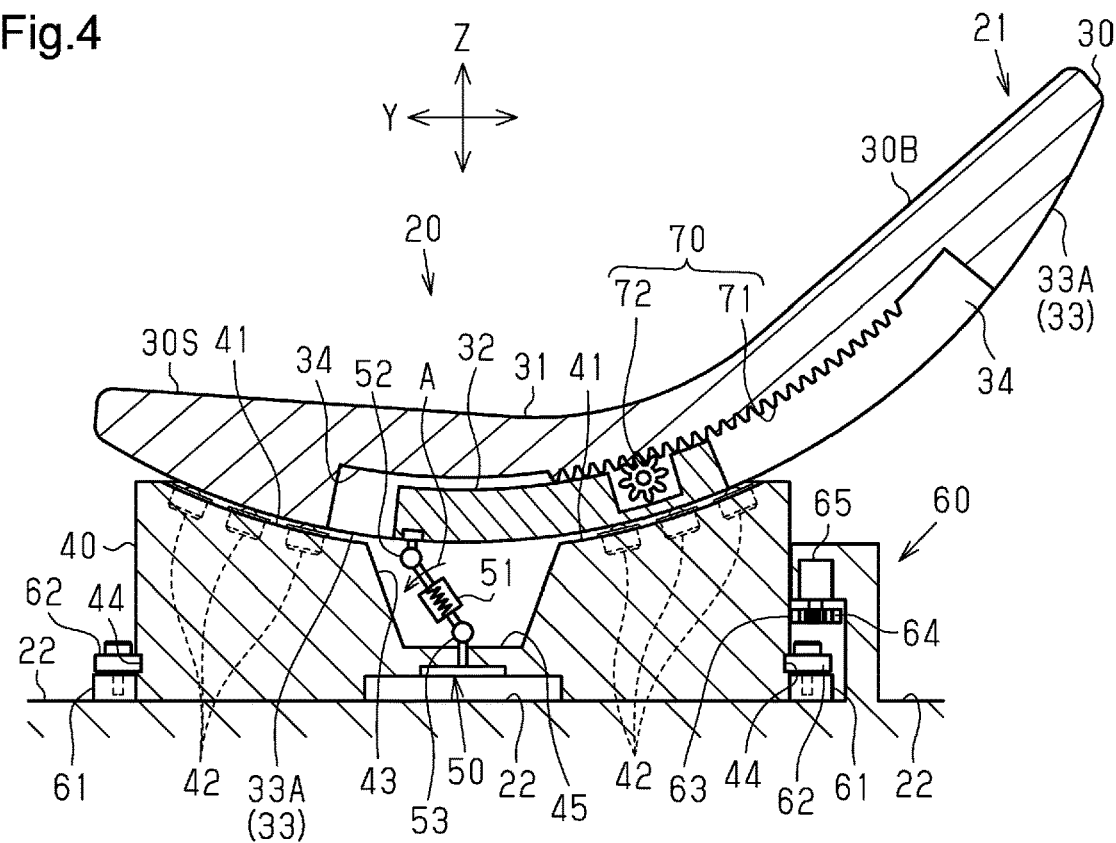
FIG. 4 is a schematic diagram of the position controlling device, showing a state in which the loading portion is moved forward with respect to the base portion.

FIG. 4 illustrates an example of a manner in which the coupling portion 50 operates during traveling of the vehicle 20.

When the vehicle 20 decelerates, an inertial force acts on the seat 21 in such a manner that the loading portion 30 moves forward. In the example shown in FIG. 4, at the time of deceleration of the vehicle 20, the guide portions 42 allow the seat portion 30S of the loading portion 30 to be moved to the front side (left side in FIG. 4) of the seat 21 with respect to the base portion 40. At this time, the upper coupling portion 52, which is coupled to the loading portion 30, is pulled by the loading portion 30, so that the spring portion 51 falls toward the front side of the seat 21 as indicated by arrow A in FIG. 4. Since the spring portion 51 extends, the compression coil spring inside the spring portion 51 is elastically deformed in the compression direction. Thereafter, when the inertial force acting on the loading portion 30 decreases, the compression coil spring in the spring portion 51 is restored to its original length (length prior to the compression deformation), and the spring portion 51 is restored to its original length (length prior to the extension). Accordingly, the relative positions of the loading portion 30 and the base portion 40 also return to their original positions (positions prior to the movement); specifically, the positions (the positions shown in FIG. 1) before the inertial force associated with the deceleration of the vehicle 20 acts on the loading portion 30.

In the seat 21 of the present embodiment, when the vehicle 20 travels, relative movement between the loading portion 30 and the base portion 40 is allowed in all directions. For example, when the vehicle 20 is accelerated, the seat portion 30S of the loading portion 30 moves toward the rear side of the seat 21 with respect to the base portion 40.

Also, when the vehicle 20 turns right, the seat portion 30S of the loading portion 30 moves toward the left side of the seat 21 with respect to the base portion 40. When the vehicle 20 turns left, the seat portion 30S of the loading portion 30 moves toward the right side of the seat 21 with respect to the base portion 40. In the seat 21 of the present embodiment, even when the loading portion 30 and the base portion 40 move relative to each other in any direction during traveling of the vehicle 20, the spring portion 51 of the coupling portion 50 extends or contracts to attenuate the inertial force acting on the loading portion 30 of the seat 21.

Rotational Position Changing Mechanism 60

As shown in FIGS. 1 and 3, the vehicle 20 includes a rotational position changing mechanism 60. The rotational position changing mechanism 60 operates to cause the seat 21 as a whole (the loading portion 30, the base portion 40, and the coupling portion 50) to integrally rotate relative to the vehicle body 22 about a rotation axis extending in the up-down direction Z.

The rotational position changing mechanism 60 includes a support portion 61. The support portion 61 is provided on the vehicle body 22 and has a cylindrical shape that protrudes and extends upward. In the present embodiment, the lower part of the base portion 40 is accommodated inside the support portion 61 such that the inner peripheral surface of the support portion 61 and the outer peripheral surface of the base portion 40 of the seat 21 face each other.

The rotational position changing mechanism 60 includes multiple (in the present embodiment, six) bearing portions 62. Each bearing portion 62 includes a rotation shaft 62A, which extends in the up-down direction Z, and a cylindrical rotary portion 62B, which is rotatably provided around the rotation shaft 62A. The base portion 40 includes a groove (bearing groove 44) on the outer peripheral surface of the lower part. The bearing groove 44 extends over the entire circumference. In the present embodiment, the rotation shafts 62A of the bearing portion portions 62 are fixed to the upper end of the support portion 61 in a state in which the outer peripheral part of the rotary portion 62B of each bearing portion 62 is fit in the bearing groove 44 of the base portion 40. In this manner, the bearing portions 62 are disposed between the support portion 61 and the base portion 40. The bearing portions 62 attach the base portion 40 to the support portion 61 in a manner in which the base portion 40 is rotatable inside the support portion 61 and in a manner in which the base portion 40 cannot escape from the inside of the support portion 61.

The rotational position changing mechanism 60 includes a rack 63, which is provided on the base portion 40, and a pinion 64, which meshes with the rack 63. The rack 63 is provided on the outer peripheral surface of the base portion 40 so as to extend in the circumferential direction. The pinion 64 is provided on the vehicle body 22 (FIG. 1). The vehicle body 22 is provided with an electric motor (hereinafter, referred to as a rotational position changing motor 65) for rotating the pinion 64, a controlling device 66 configured to control operation of the rotational position changing motor 65, and a rotational operation switch 67. The rotational operation switch 67 is operated by an occupant when rotating the seat 21. Output signals of the rotational operation switch 67 are received by the controlling device 66. The controlling device 66 may be circuitry including: 1) one or more processors that operate according to a computer program (software); 2) one or more dedicated hardware circuits (application specific integrated circuits: ASIC) that execute at least part of various processes; or 3) a combination thereof. The processor includes a central processing unit (CPU) and memories such as a random-access memory (RAM) and a read-only memory (ROM). The memories store program codes or commands configured to cause the CPU to execute processes. The memory, which is a computer-readable medium, includes any type of media that are accessible by general-purpose computers and dedicated computers.

Operation of Rotational Position Changing Mechanism 60

The rotational position changing mechanism 60 operates in the following manner. When the rotational operation switch 67 is operated by the occupant, the controlling device 66 causes the rotational position changing motor 65 to rotate. Accordingly, the rotational position changing mechanism 60 operates to cause the base portion 40 to rotate, relative to the vehicle body 22, together with the coupling portion 50 and the loading portion 30, which are integrated with the base portion 40.

Coupling Position Changing Mechanism 70

As shown in FIGS. 1 and 2, the vehicle 20 includes a coupling position changing mechanism 70. The coupling position changing mechanism 70 operates to change the coupling position at which the coupling portion 50 is coupled to the loading portion 30 of the seat 21 in a front-rear direction Y of the seat 21 (specifically, in the front-rear direction of the occupant seated on the seat 21).

Hereinafter, a specific structure of the coupling position changing mechanism 70 will be described.

The loading portion 30 of the seat 21 includes a seat body 31 and a movable portion 32.

The seat body 31 forms a majority part of the loading portion 30. The seat body 31 includes a receiving hole 34 at a position that corresponds to the support surface 33A. The receiving hole 34 extends from the lower surface of the seat portion 30S to the back surface of the backrest portion 30B. The receiving hole 34 has an arcuate cross section and extends in the front-rear direction Y of the seat 21. The depth and the width in the extending direction of the receiving hole 34 are substantially constant.

The movable portion 32 has an arcuate cross section and extends in the front-rear direction Y of the seat 21. In the present embodiment, the movable portion 32 is received in the receiving hole 34 of the seat body 31 such that the outer surface of the movable portion 32 and the outer surface of the seat body 31 are substantially flush with each other, and these outer surfaces form the support surface 33A.

A slide mechanism (not shown) is provided between the receiving hole 34 of the seat body 31 and the movable portion 32. The movable portion 32 is attached to the receiving hole 34 with the slide mechanism in a state in which the movable portion 32 can reciprocate in the front-rear direction Y inside the receiving hole 34, but cannot escape from the inside of the receiving hole 34. In the present embodiment, the upper end of the coupling portion 50 (specifically, the upper coupling portion 52) is fixed to the movable portion 32.

The coupling position changing mechanism 70 includes a rack 71, which is provided on the seat body 31, and a pinion 72 (FIG. 1), which meshes with the rack 71. The rack 71 is provided on the bottom surface of the receiving hole 34 so as to extend in the front-rear direction Y of the seat 21. The pinion 72 is provided inside the movable portion 32. The movable portion 32 incorporates an electric motor (hereinafter, referred to as a coupling position changing motor 73) for rotating the pinion 72, and a controlling device 74 configured to control operation of the coupling position changing motor 73. The controlling device 74 may be circuitry including: 1) one or more processors that operate according to a computer program (software); 2) one or more dedicated hardware circuits (application specific integrated circuits: ASIC) that execute at least part of various processes; or 3) a combination thereof. The processor includes a central processing unit (CPU) and memories such as a random-access memory (RAM) and a read-only memory (ROM). The memories store program codes or commands configured to cause the CPU to execute processes. The memory, which is a computer-readable medium, includes any type of media that are accessible by general-purpose computers and dedicated computers. A coupling operation switch 75 is attached to a vehicle body 22. The coupling operation switch 75 is operated by the occupant when changing the inclination angle (position) of the loading portion 30 of the seat 21 in the front-rear direction Y. Output signals of the coupling operation switch 75 are received by the controlling device 74.

Operation of Coupling Position Changing Mechanism 70

The coupling position changing mechanism 70 operates in the following manner.

When the coupling operation switch 75 is operated by the occupant, the controlling device 74 causes the coupling position changing motor 73 to rotate. This causes the coupling position changing mechanism 70 to operate, so that the movable portion 32 and the seat body 31 move relative to each other in the front-rear direction Y of the seat 21. The movable portion 32 is coupled to the base portion 40 by the coupling portion 50. Therefore, when the movable portion 32 and the seat body 31 move relative to each other, the coupling portion 50 normally remains at the current position and the seat body 31 moves in the front-rear direction Y. This changes the position of the loading portion 30 (specifically, the seat body 31) of the seat 21 in the front-rear direction Y.

Figure 5:
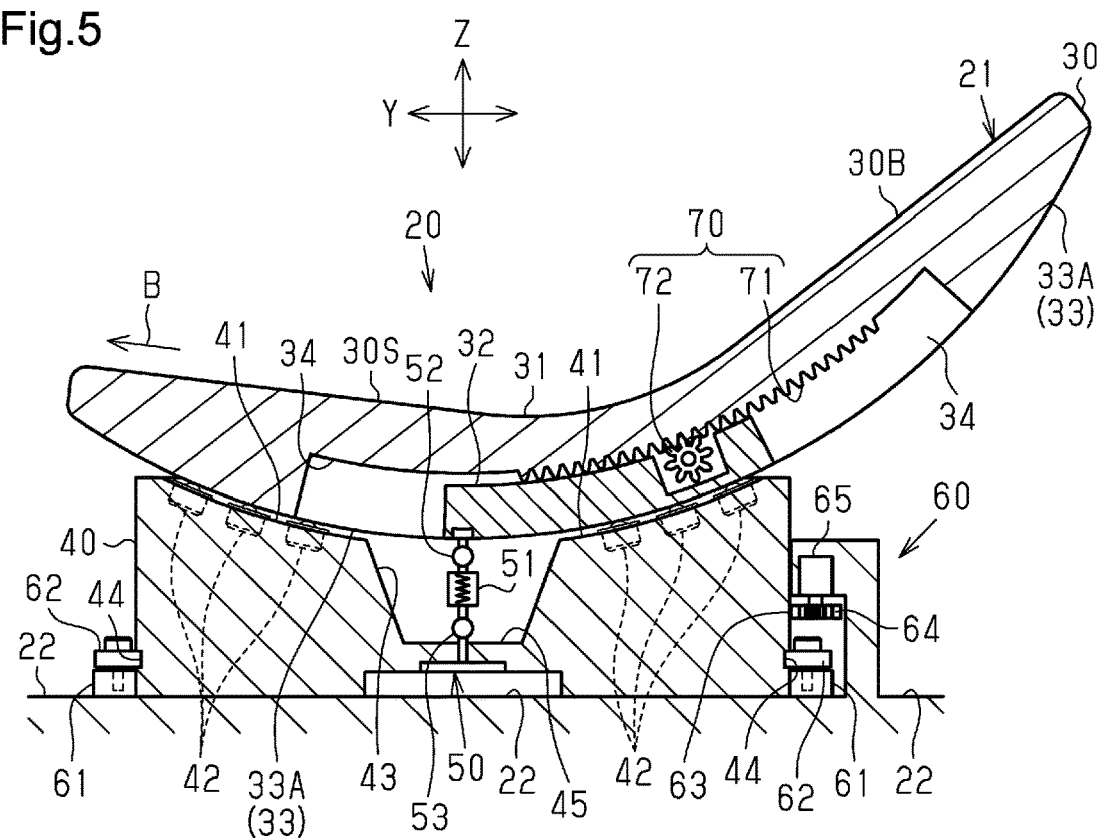
FIG. 5 is a schematic diagram of the position controlling device, showing a state in which a seat body is moved forward with respect to a movable portion.

FIG. 5 illustrates an example of an operation of the coupling position changing mechanism 70 when the seat body 31 is moved forward (indicated by arrow B in the drawing) with respect to the movable portion 32 of the seat 21. In this case, the front end of the seat portion 30S is raised, and the backrest portion 30B is tilted rearward as shown in FIG. 5.

When the seat body 31 is moved rearward with respect to the movable portion 32 of the seat 21, the front end of the seat portion 30S is lowered and the backrest portion 30B is raised and moved forward.

In the present embodiment, the rotational position changing mechanism 60 operates to change the position of the seat 21 (specifically, the seat body 31) in a default state, in which no inertial force is acting on the loading portion 30.

The Present Embodiment has the Following Advantages (1-1) The seat 21 includes the loading portion 30, the base portion 40, and the coupling portion 50. The loading portion 30 is provided in the upper part of the base portion 40 such that the support surface 33A of the lower convex portion 33 of the loading portion 30 faces the inner surface of the upper concave portion 41 of the base portion 40. The coupling portion 50 includes the spring portion 51 and couples the base portion 40 and the loading portion 30 to each other with the spring portion 51 between them. The support surface 33A of the lower convex portion 33 of the loading portion 30 has a spherical surface. The inner surface of the upper concave portion 41 of the base portion 40 includes the guide portions 42. The guide portions 42 guide the base portion 40 and the loading portion 30 such that the base portion 40 and the loading portion 30 move relative to each other in a direction along the support surface 33A of the lower convex portion 33, which has a spherical surface.

As described above, when the vehicle 20 travels, an inertial force acts on the seat 21 and the occupant seated on the seat 21. According to the present embodiment, when such an inertial force is generated, the guide portions 42 allow the loading portion 30 and the base portion 40 of the seat 21 to move relative to each other. When the loading portion 30 and the base portion 40 are moved relative to each other, the spring portion 51 of the coupling portion 50 extends or contracts so as to attenuate the inertial force acting on the loading portion 30 of the seat 21. This reduces the shock acting on the loading portion 30, stabilizing the position of the loading portion 30 and the position of the occupant seated on the loading portion 30.

(1-2) The seat 21 is provided with the coupling position changing mechanism 70, which is configured to change the coupling position at which the coupling portion 50 is coupled to the loading portion 30. When the coupling position changing mechanism 70 operates through operation of the coupling operation switch 75 by the occupant, the relative positions of the base portion 40 and the loading portion 30 in the default state, in which no inertial force is acting on the loading portion 30, is changed.

According to the present embodiment, the coupling position changing mechanism 70 operates to allow the position of the loading portion 30 in the default state (hereinafter referred to as a default position) to be set such that the seating surface of the seat portion 30S is horizontal as shown in FIG. 1. Further, as shown in the example in FIG. 5, it is also possible to set the default position of the loading portion 30 such that the seating surface of the seat portion 30S is inclined in the front-rear direction Y. In this manner, the present embodiment allows the default position of the loading portion 30 to be set flexibly.

(1-3) The vehicle 20 is provided with the rotational position changing mechanism 60. The rotational position changing mechanism 60 operates to cause the seat 21 as a whole to integrally rotate relative to the vehicle body 22 about the rotation axis extending in the up-down direction Z.

According to the present embodiment, it is possible to freely change the orientation (specifically, the rotational position) of the seat 21 about the rotation axis extending in the up-down direction Z by operating the rotational position changing mechanism 60 through operation of the rotational operation switch 67 by the occupant. This allows the default position of the loading portion 30 of the seat 21 to be set in a highly flexible manner.

Second Embodiment

A position controlling device according to a second embodiment will now be described with reference to FIGS. 6 to 10. Differences from the first embodiment will mainly be discussed. In the following description, among the components of the position controlling device according to the present embodiment, the same components as those of the position controlling device according to the first embodiment are denoted by the same reference numerals or corresponding reference numerals, and redundant description of the components is omitted.

Unlike the position controlling device of the first embodiment, the position controlling device of the present embodiment is not provided with the coupling position changing mechanism 70 (see FIG. 1) or its peripheral devices. The position controlling device of the present embodiment is different from the position controlling device of the first embodiment in that it has a relative position changing mechanism that is driven in accordance with the moving state of the vehicle.

The relative position changing mechanism and the structure surrounding it will be described.

Loading Portion 130

Figure 6:
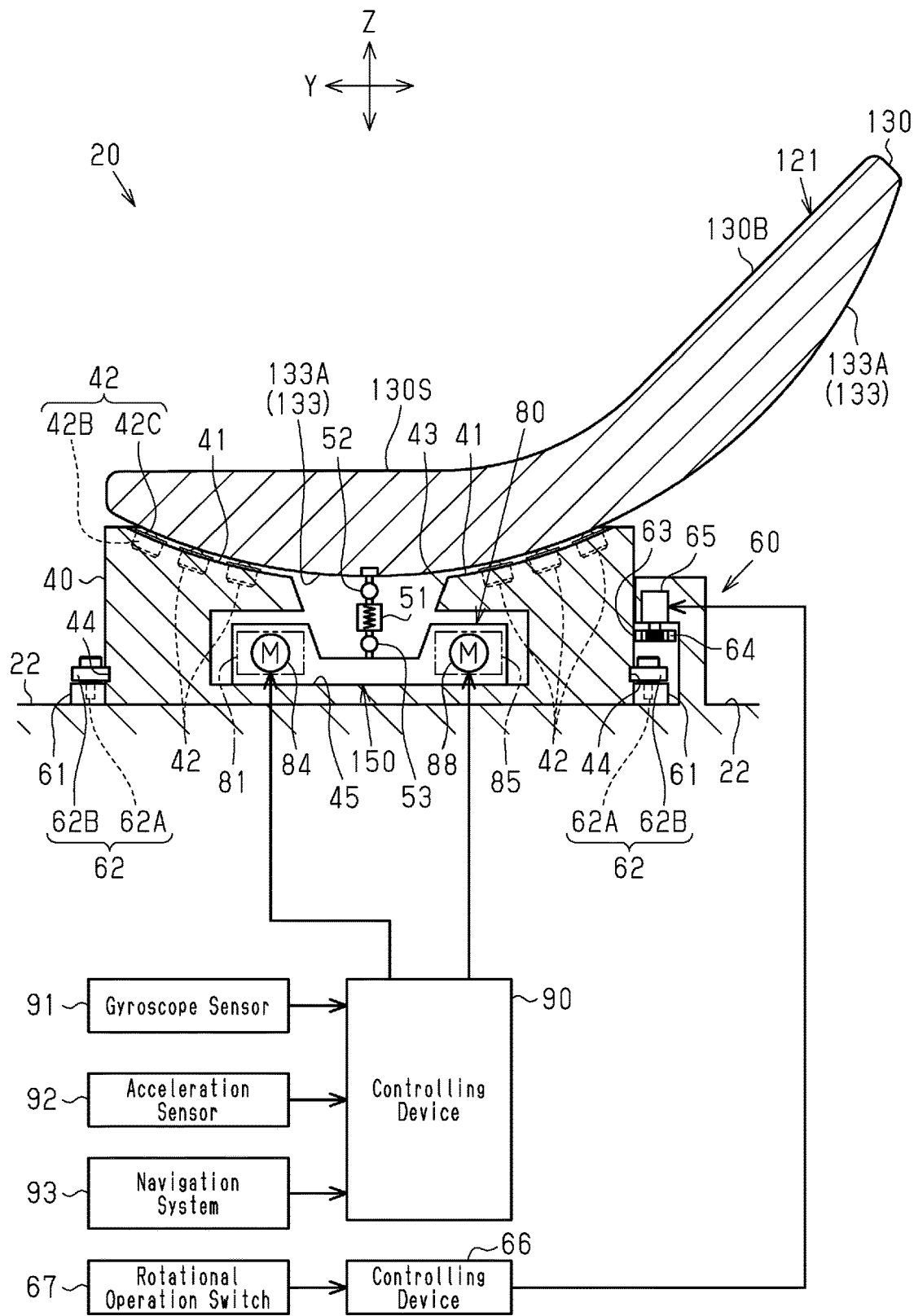
FIG. 6 is a schematic diagram showing a position controlling device according to a second embodiment.
Figure 7:
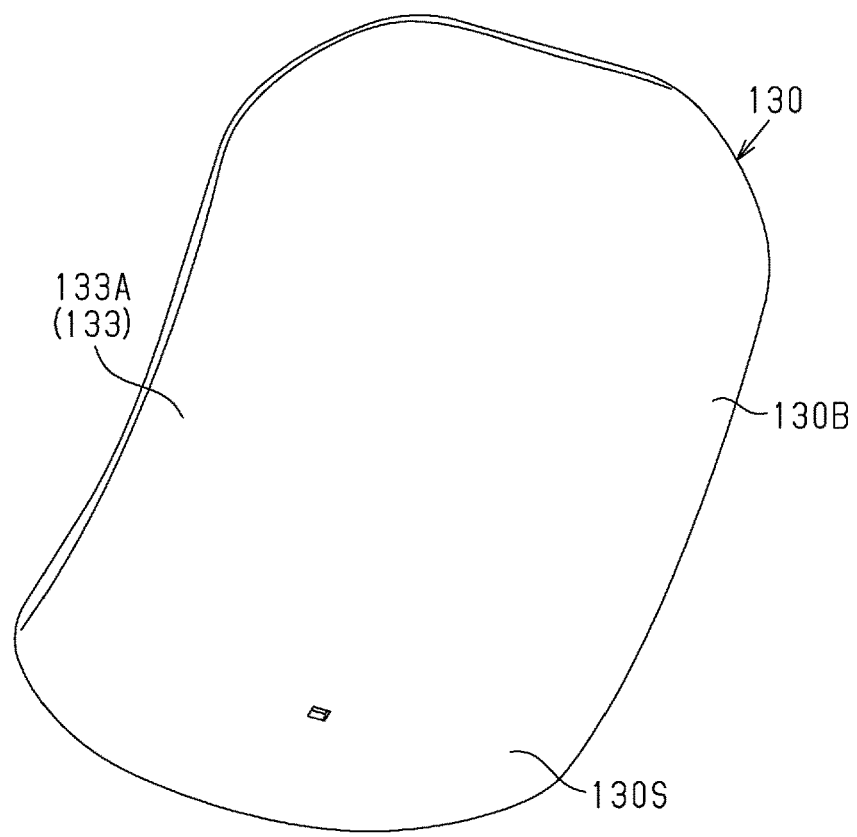
FIG. 7 is a perspective view from obliquely below, showing a loading portion according to the second embodiment.

As shown in FIGS. 6 and 7, a loading portion 130 of a seat 121 has a structure in which a seat portion 130S and a backrest portion 130B are formed integrally. The loading portion 130 includes a lower convex portion 133, which includes a lower part of the seat portion 130S and a back part of the backrest portion 130B. An outer surface (hereinafter, referred to as a support surface 133A) of the lower convex portion 133 has a spherical surface bulging in a direction away from the occupant seated on the loading portion 130. The loading portion 130 of the present embodiment does not include movable parts, and is formed as an integral component as a whole.

Relative Position Changing Mechanism 80

Figure 8:
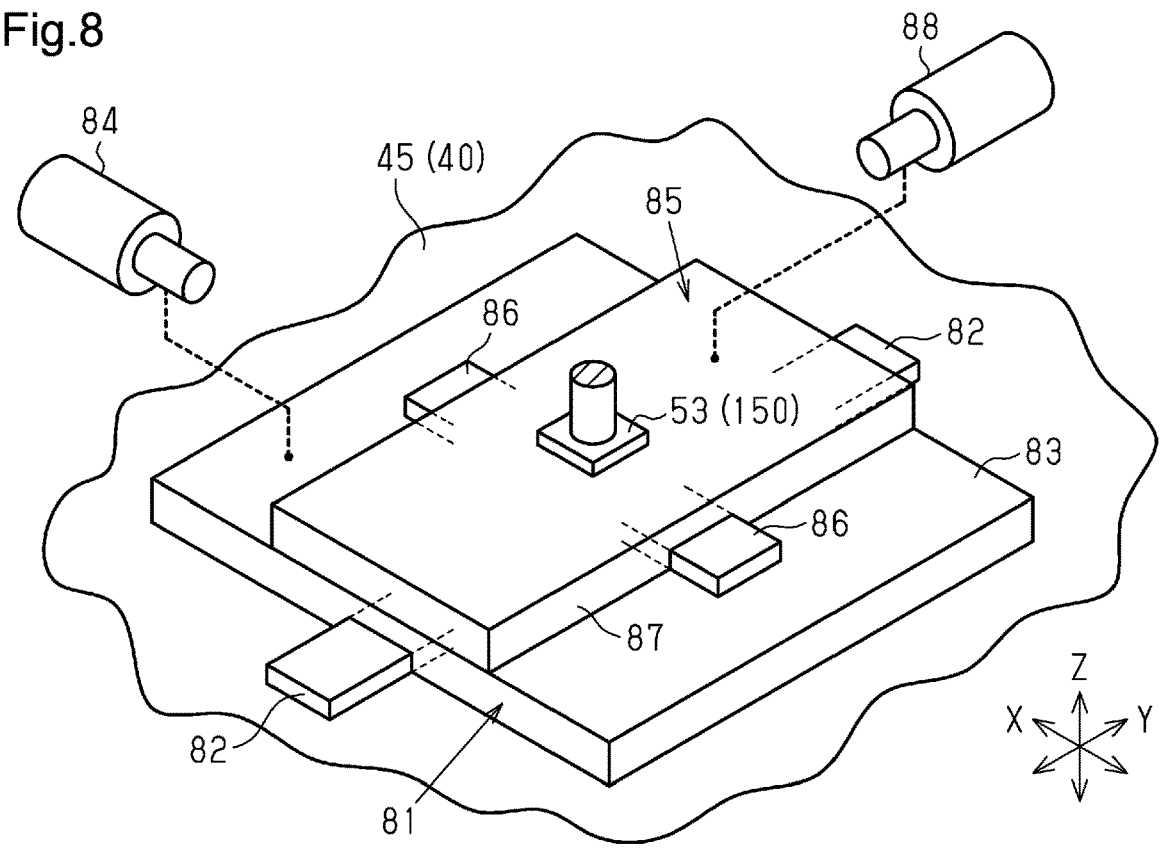
FIG. 8 is a schematic diagram showing a relative position changing mechanism according to the second embodiment.

As shown in FIGS. 6 and 8, the seat 121 is provided with a relative position changing mechanism 80. The relative position changing mechanism 80 is provided between a lower coupling portion 53 of the coupling portion 150 and a bottom wall 45 of a coupling recess 43 of the base portion 40 so as to form a middle part of the coupling portion 150 in the up-down direction Z. The relative position changing mechanism 80 operates to displace the bottom wall 45 of the coupling recess 43 of the base portion 40 and the lower end of the lower coupling portion 53 from each other in a second direction intersecting the up-down direction Z (specifically, the second direction extends along a plane orthogonal to the up-down direction Z). In the present embodiment, the bottom wall 45 of the coupling recess 43 of the base portion 40, to which one end of the relative position changing mechanism 80 in the up-down direction Z is coupled, corresponds to a part closer to the base portion, and the lower end of the lower coupling portion 53, to which the other end of the relative position changing mechanism 80 is coupled, corresponds to a part closer to the loading portion.

Specifically, the relative position changing mechanism 80 includes a front-rear direction changing mechanism 81 and a lateral direction changing mechanism 85. The front-rear direction changing mechanism 81 operates to shift the bottom wall 45 of the base portion 40 and the lower end of the lower coupling portion 53 in the front-rear direction Y of the seat 121. The lateral direction changing mechanism 85 operates to shift the bottom wall 45 and the lower end of the lower coupling portion 53 in a lateral direction X of the seat 121.

As shown in FIG. 8, a guide rail 82 is provided on the bottom wall 45 of the base portion 40 so as to extend in the front-rear direction Y of the seat 121. A rectangular plate-shaped guide table 83 is attached to the bottom wall 45 of the base portion 40 with the guide rail 82 between the bottom wall 45 and the base portion guide table 83. The guide table 83 is guided by the guide rail 82 so as to reciprocate in the front-rear direction Y with respect to the base portion 40. The guide rail 82 and the guide table 83 form the front-rear direction changing mechanism 81.

An electric motor (hereinafter, referred to as a front-rear direction motor 84), which serves as a drive unit, is connected to the guide table 83 via a gear mechanism (not shown). In the present embodiment, the guide table 83 is moved in the front-rear direction Y by driving the front-rear direction changing mechanism 81 through an operation control of the front-rear direction motor 84.

A guide rail 86 is provided on the upper surface of the guide table 83 so as to extend in the lateral direction X of the seat 121. A rectangular plate-shaped guide table 87 is attached to the upper surface of the guide table 83 with the guide rail 86 between the guide table 87 and the upper surface of the guide table 83. The guide table 87 is guided by the guide rail 86 so as to reciprocate in the lateral direction X with respect to the base portion 40 (specifically, the guide table 83). The guide rail 86 and the guide table 87 form the lateral direction changing mechanism 85.

An electric motor (hereinafter, referred to as a lateral direction motor 88), which serves as a drive unit, is connected to the guide table 87 via a gear mechanism (not shown). In the present embodiment, the guide table 87 is moved in the lateral direction by driving the lateral direction changing mechanism 85 through an operation control of the lateral direction motor 88.

Controlling Device 90

As shown in FIG. 6, the vehicle 20 includes a controlling device 90 configured to execute the operation control of the front-rear direction motor 84 and the operation control of the lateral direction motor 88. The controlling device 90 may be circuitry including: 1) one or more processors that operate according to a computer program (software); 2) one or more dedicated hardware circuits (application specific integrated circuits: ASIC) that execute at least part of various processes; or 3) a combination thereof. The processor includes a central processing unit (CPU) and memories such as a random-access memory (RAM) and a read-only memory (ROM). The memories store program codes or commands configured to cause the CPU to execute processes. The memory, which is a computer-readable medium, includes any type of media that are accessible by general-purpose computers and dedicated computers. The vehicle 20 is provided with various sensors that detect the behavior of the vehicle 20, such as a gyroscope sensor 91 and an acceleration sensor 92. Detection signals of various sensors are delivered to the controlling device 90. The vehicle 20 is also provided with a navigation system 93. In the present embodiment, the navigation system 93 outputs location information and map information as output signals that are received by the controlling device 90.

The controlling device 90 performs various calculations based on the output signals of the various sensors and the output signals of the navigation system 93, and performs operation control of the front-rear direction motor 84 and operation control of the lateral direction motor 88 based on the calculation results. In the present embodiment, the various sensors and the navigation system 93 correspond to an acquisition unit, the output signals of the various sensors and the output signals of the navigation system 93 correspond to information regarding a moving state of a mobile object, and the controlling device 90 corresponds to a control unit.

Operation of Relative Position Changing Mechanism 80

The relative position changing mechanism 80 operates in the following manner.

When the controlling device 90 performs an operation control of the front-rear direction motor 84 to operate the front-rear direction changing mechanism 81, the lower part of the coupling portion 150 moves in the front-rear direction Y with respect to the base portion 40. At this time, the loading portion 130 of the seat 121 is pulled by the coupling portion 150, which is coupled to the loading portion 130, so as to move in the front-rear direction Y together with the coupling portion 150. This moves the loading portion 130 of the seat 121 in a direction along the outer surface of the spherical lower convex portion 133.

Figure 9:
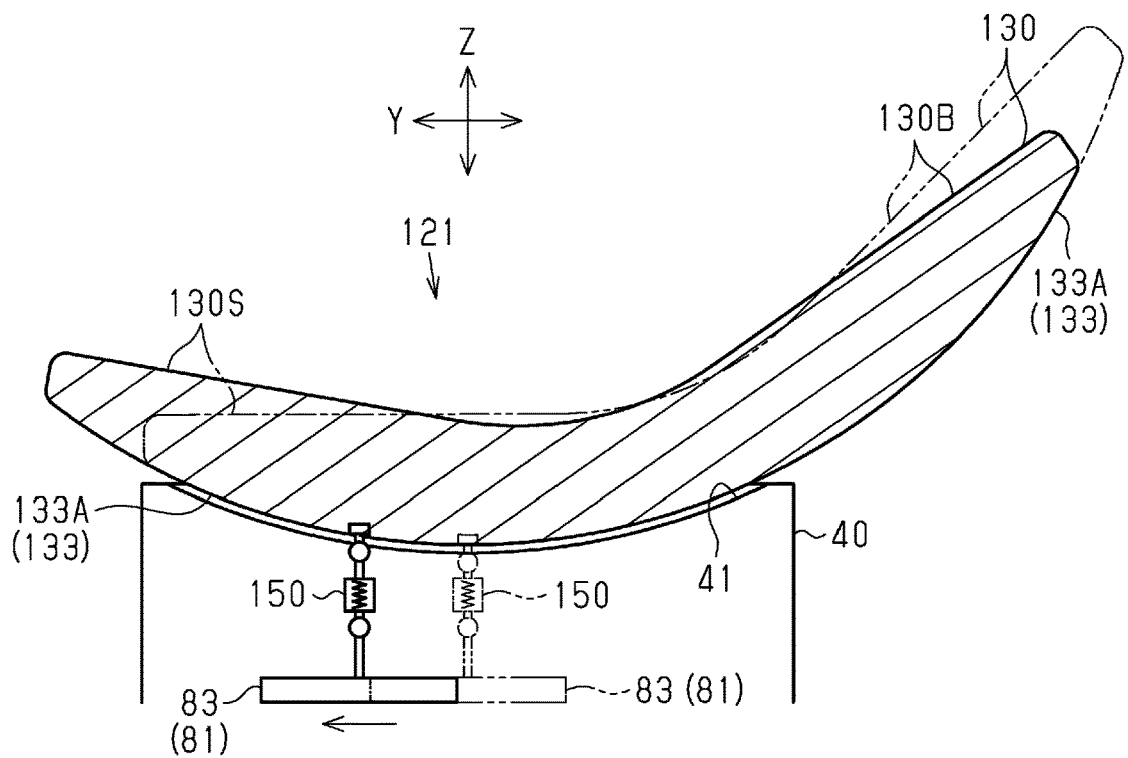
FIG. 9 is a schematic diagram of a seat, showing a state in which the loading portion is moved forward with respect to the base portion.

FIG. 9 illustrates an example of a manner in which the position of the loading portion 130 of the seat 121 is changed when the front-rear direction changing mechanism 81 operates to move the guide table 83 and the coupling portion 150 forward. The long-dash double-short-dash line in FIG. 9 represents the default position of the loading portion 130 of the seat 121, and the solid line in FIG. 9 represents the position of the loading portion 130 of the seat 121 when the front-rear direction changing mechanism 81 operates. In FIG. 9, the amounts of movements of the guide table 83, the coupling portion 150, and the loading portion 130 are exaggerated in order to facilitate understanding.

As shown in FIG. 9, when the front-rear direction changing mechanism 81 operates to move the guide table 83 and the coupling portion 150 forward, the front end of the seat portion 130S of the seat 121 is raised (the state represented by the solid line in the drawing) and the backrest portion 130B is tilted rearward.

When the front-rear direction changing mechanism 81 operates to move the guide table 83 and the coupling portion 150 rearward with respect to the base portion 40, the front end of the seat portion 130S of the seat 121 is lowered and the backrest portion 130B is raised in a forward direction.

In addition, when the operation control of the lateral direction motor 88 is performed by the controlling device 90 to operate the lateral direction changing mechanism 85, the lower part of the coupling portion 150 moves in the lateral direction X with respect to the base portion 40. At this time, the loading portion 130 of the seat 121 is pulled by the coupling portion 150 coupled to the loading portion 130 so as to move in the lateral direction X together with the coupling portion 150. This moves the loading portion 130 of the seat 121 in a direction along the outer surface of the spherical lower convex portion 33.

Figure 10:
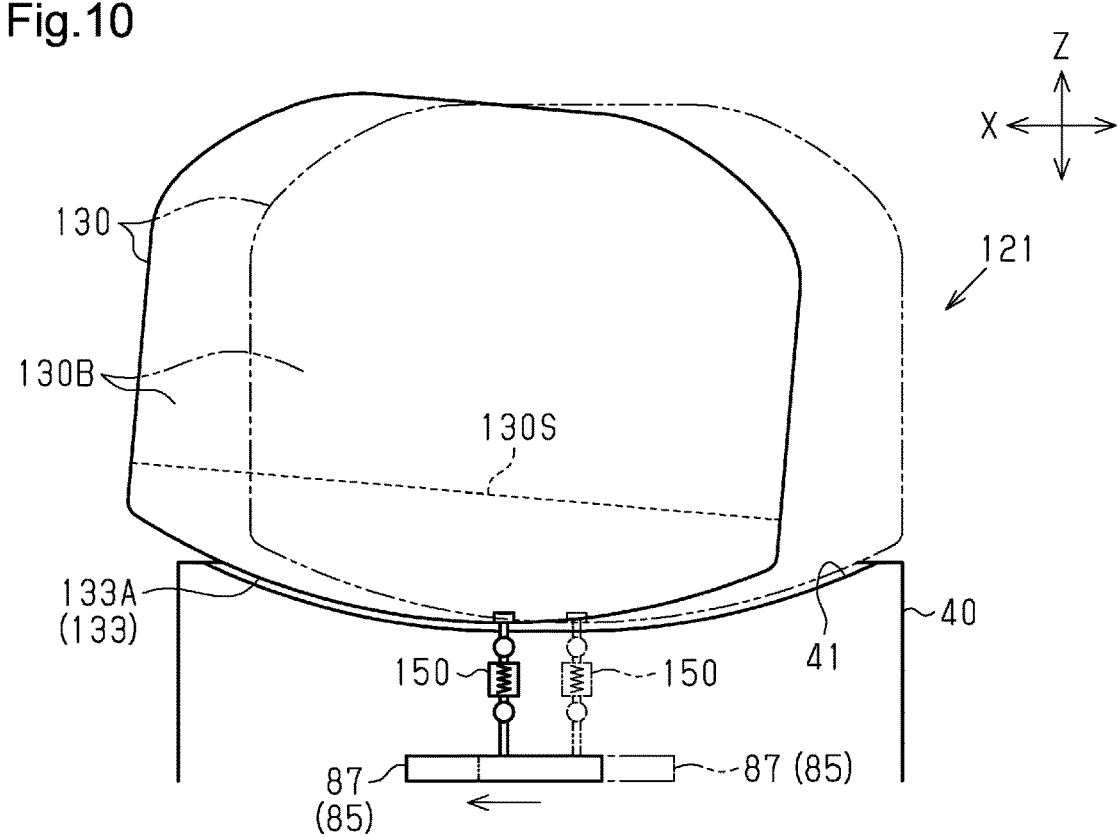
FIG. 10 is a schematic diagram of the seat, showing a state in which the loading portion is moved leftward with respect to the base portion.

FIG. 10 illustrates an example of a manner in which the position of the loading portion 130 of the seat 121 is changed when the lateral direction changing mechanism 85 operates to move the guide table 87 and the coupling portion 150 forward. The long-dash double-short-dash line in FIG. 10 represents the default position of the loading portion 130 of the seat 121, and the solid line in FIG. 10 represents the position of the loading portion 130 of the seat 121 when the lateral direction changing mechanism 85 operates. In FIG. 10, the amounts of movements of the guide table 87, the coupling portion 150, and the loading portion 130 are exaggerated in order to facilitate understanding.

As shown in FIG. 10, when the lateral direction changing mechanism 85 operates to move the guide table 87 and the coupling portion 150 leftward with respect to the base portion 40, the seating surface of the seat portion 130S is inclined such that the left side of the seat portion 130S is raised.

When the lateral direction changing mechanism 85 operates to move the guide table 87 and the coupling portion 50 rightward with respect to the base portion 40, the seating surface of the seat portion 130S is inclined such that the right side of the seat portion 130S is raised.

In the present embodiment, when the controlling device 90 simultaneously performs the operation control of the front-rear direction motor 84 and the operation control of the lateral direction motor 88, the front-rear direction changing mechanism 81 and the lateral direction changing mechanism 85 operate in combination. In this case, the coupling portion 150 can be moved in any direction with respect to the base portion 40. Thus, the loading portion 130 of the seat 121 can also be moved in any direction together with the coupling portion 150 by being pulled by the coupling portion 150 coupled to the loading portion 130.

The controlling device 90 performs the operation control of the front-rear direction motor 84 and the operation control of the lateral direction motor 88 in the following manner.

Control Example 1

The loading portion 130 is moved in accordance with the actual behavior of the vehicle 20, so as to cancel the shock applied to the seat 121.

For example, when deceleration of the vehicle 20 is detected, the front-rear direction changing mechanism 81 operates in accordance with the deceleration to move the coupling portion 150 forward. In this case, since the loading portion 130 of the seat 121 is pulled and moved forward in accordance with the deceleration of the vehicle 20, the shock applied to the seat 121 and the occupant on the seat 121 is reduced.

In addition, when a right turn of the vehicle 20 is detected, the lateral direction changing mechanism 85 operates in accordance with the right turn to move the coupling portion 50 leftward. In this case, since the loading portion 130 of the seat 121 is pulled and moved rightward in accordance with the right turn of the vehicle 20, the shock applied to the seat 121 and the occupant is reduced.

Control Example 2

The moving state of the vehicle 20 is predicted based on information (location information and map information) acquired from the navigation system 93, and the position of the loading portion 30 is controlled in accordance with the predicted moving state.

For example, at a time at which the vehicle 20 is predicted to reach a corner, the lateral direction changing mechanism 85 operates to move the coupling portion 50 outward with respect to the turning direction. In this case, when the vehicle 20 is about to turn, the position of the seat 121 and the position of the occupant seated on the seat 121 are set to positions tilted inward with respect to the turning direction in advance in preparation for the turn of the vehicle 20.

The Present Embodiment has the Following Advantages (2-1) The seat 121 is provided with the relative position changing mechanism 80. The relative position changing mechanism 80 operates to displace the bottom wall 45 of the coupling recess 43 of the base portion 40 and the lower end of the lower coupling portion 53 from each other in the second direction, which intersects the up-down direction Z. The vehicle 20 is provided with the front-rear direction motor 84 and the lateral direction motor 88, which drive the relative position changing mechanism 80, and the controlling device 90, which performs the operation control of the motors 84, 88. The vehicle 20 is provided with the various sensors and the navigation system 93, which are used to acquire information regarding the moving state of the vehicle 20. The controlling device 90 performs the operation control of the motors 84, 88 based on information regarding the moving state of the vehicle 20, which is acquired from the various sensors and the navigation system 93, thereby causing the relative position changing mechanism 80 to operate.

According to the present embodiment, it is possible to control the position of the loading portion 130 of the seat 121 in a highly flexible manner. For example, the position of the loading portion 130 can be controlled in accordance with the actual traveling state of the vehicle 20. Also, the position of the loading portion 130 can be controlled in advance in accordance with a predicted moving state of the vehicle 20. Therefore, it is possible to finely control the position of the seat 121 and the position of the occupant seated on the seat 121 in accordance with the situation.

(2-2) The present embodiment achieves the same advantages as the advantages described in the above-described items (1-1) and (1-3).

Other Embodiments

The above-described embodiments may be modified as follows. The above-described embodiments and the following modifications can be combined as long as the combined modifications remain technically consistent with each other.

In the first embodiment, the coupling position changing mechanism 70 is not limited to a rack-and-pinion mechanism including the rack 71 provided on the seat body 31 and the pinion 72 provided on the movable portion 32, but may be any mechanism. That is, any mechanism can be used as a coupling position changing mechanism as long as it has a structure capable of changing the coupling position at which the coupling portion 50 is coupled to the loading portion 30.

Figure 11:
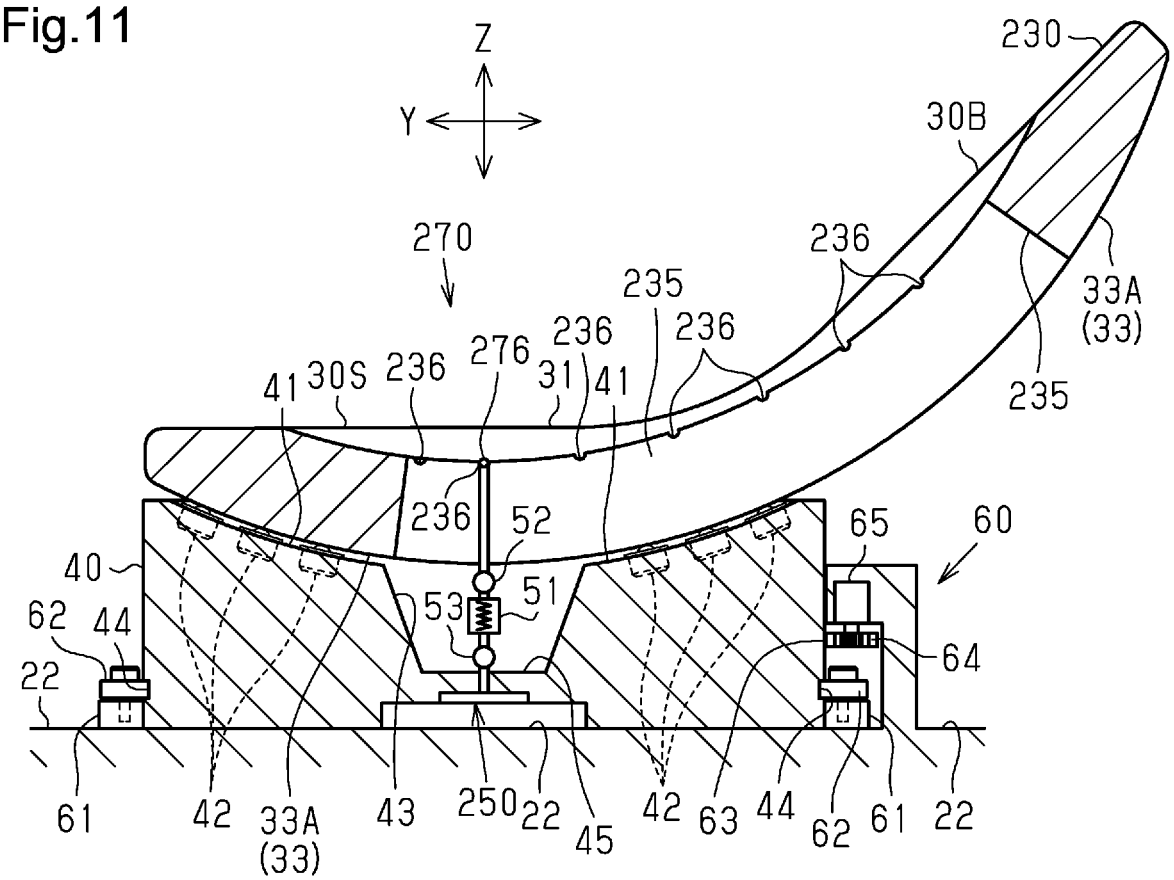
FIG. 11 is a schematic diagram showing a position controlling device according to another embodiment.

FIG. 11 shows a coupling position changing mechanism 270 as an example. As shown in FIG. 11, a hook 276 in this example is provided at an end portion of the upper coupling portion 52 of a coupling portion 250 at the side closer to a loading portion 230. The loading portion 230 includes a through-hole 235. The coupling portion 250 is inserted into the through-hole 235. The loading portion 230 includes recesses (hereinafter referred to as locking recesses 236) at the upper edge of the through-hole 235. The hook 276 is hooked to any of the locking recess 236. The locking recesses 236 are provided at multiple locations (seven locations in this example) so as to be arranged at intervals in the front-rear direction Y. In the coupling position changing mechanism 270 of the present example, the hook 276 of the coupling portion 250 is hooked to selected one of the locking recesses 236, so as to adjust the position of the loading portion 230 in the front-rear direction Y in multiple stages.

In the first embodiment, the coupling position changing mechanism 70 has a structure capable of changing the coupling position at which the coupling portion 50 is coupled to the loading portion 30. However, the present disclosure is not limited thereto. For example, a mechanism may be used that is capable of changing the coupling position at which the coupling portion 50 is coupled to the base portion 40.

In the first embodiment, the base portion 40 of the seat 21 may be fixed to the vehicle body 22. In this case, as a rotational position changing mechanism, it is possible to provide a mechanism that causes the coupling position changing mechanism 70, the loading portion 30, and the coupling portion 50 to integrally rotate relative to the base portion 40 about a rotation axis extending in the up-down direction Z. With this configuration, the loading portion 30 of the seat 21 can be rotated with respect to the vehicle body 22 about a rotation axis extending in the up-down direction Z by causing the rotational position changing mechanism to operate.

In the second embodiment, the operation control of the rotational position changing motor 65, which corresponds to the rotational position changing mechanism 60, may be performed together with the operation control of the motors 84, 88, which correspond to the relative position changing mechanism 80, based on information regarding the moving state of the vehicle 20. With this configuration, it is possible to control the orientation of the seat 121 about the rotation axis extending in the up-down direction Z in addition to controlling the position of the seat 121 in the front-rear direction Y and the lateral direction X. This allows the position of the loading portion 130 of the seat 121 to be controlled in a highly flexible manner.

In the second embodiment, any suitable device, for example, a camera, a radar sensor, or a LiDAR sensor may be used as the acquisition unit for acquiring the information regarding the moving state of the vehicle 20.

In the second embodiment, the arrangement position of the relative position changing mechanism 80 may be set to any position as long as the relative position changing mechanism 80 forms a middle part of the coupling portion 50 in the up-down direction Z. For example, the relative position changing mechanism 80 may be provided between the lower coupling portion 53 and the spring portion 51 or between the upper coupling portion 52 and the loading portion 130.

In the second embodiment, the drive unit that drives the relative position changing mechanism 80 may be a hydraulic actuator, a pneumatic actuator, or the like, instead of an electric motor.

In the second embodiment, one of the front-rear direction changing mechanism 81 and the lateral direction changing mechanism 85 may be omitted.

In the second embodiment, the relative position changing mechanism 80, that is, both of the front-rear direction changing mechanism 81 and the lateral direction changing mechanism 85, may be omitted. In this case, the lower end of the lower coupling portion 53 may be coupled to the bottom wall 45 of the base portion 40.

In the second embodiment, the base portion 40 may be fixed to the vehicle body 22. In this case, as a rotational position changing mechanism, it is possible to provide a mechanism that causes the loading portion 130 and the coupling portion 150 (including the relative position changing mechanism 80) to integrally rotate relative to the base portion 40 about a rotation axis extending in the up-down direction Z. With this configuration, the loading portion 130 of the seat 121 can be rotated with respect to the vehicle body 22 about a rotation axis extending in the up-down direction Z by causing the rotational position changing mechanism to operate.

In each of the embodiments, a part of the outer surface of the lower convex portion 33, 133 may have a shape other than a spherical surface. For example, an edge portion of the lower convex portion 33, 133 of the loading portion 30, 130 may have a shape other than a spherical surface. That is, the outer surface shape of the lower convex portion 33, 133 may be changed as long as all portions of the outer surface of the lower convex portion 33, 133 that are in contact with the respective guide portions 42 form the same spherical surface.

In each embodiment, the inner surface of the upper concave portion 41 of the base portion 40 is not limited to a substantially spherical surface, but may be formed in any shape. In addition, it is also possible to use a base portion 40 having a structure without the upper concave portion 41. That is, the upper structure of the base portion 40 may be changed as long as the guide portions 42 can be arranged such that the portions of the guide portions 42 in contact with the lower convex portion 33, 133 are aligned on the same spherical surface.

In each of the embodiments, the guide portions 42 may be provided in the lower convex portion 33 of the loading portion 30 instead of being provided in the upper concave portion 41 of the base portion 40. In this configuration, the inner surface of the upper concave portion 41 of the base portion 40 may be formed into a substantially spherical surface. In this configuration, the inner surface of the upper concave portion 41 corresponds to a surface that supports the loading portion 30. Further, in the above-described configuration, the guide portions 42 may be disposed in the lower part of the loading portion 30 such that portions of the guide portions 42 that are in contact with the upper concave portion 41 are arranged on the same spherical surface. In this case, the part of the outer surface of the loading portion 30 below the seat portion 30S and the back part of the backrest portion 30B are not limited to being substantially spherical, but may be formed into any shape.

In each of the embodiments, the guide portions 42 are not limited to including the case 42B and the contact ball 42C, but may have any suitable structure. For example, the inner surface of the upper concave portion 41 of the base portion 40 may be formed into a spherical surface, and the inner surface of the upper concave portion 41 may be used as a guide portion. In this case, the loading portion 30, 130 may be provided on the base portion 40 such that the lower convex portion 33, 133 of the loading portion 30, 130 is received by the upper concave portion 41 of the base portion 40. In this case, in order to improve sliding, it is preferable to supply (apply) a lubricant (oil, grease) or supply compressed air between the inner surface of the upper concave portion 41 of the base portion 40 and the outer surface of the lower convex portion 33, 133 of the loading portion 30, 130.

In each of the embodiments, the spring portion 51 may be a shock absorber in which the damping force in a compression direction is smaller than the damping force in an extension direction, in place of a type incorporating a compression coil spring.

In each of the embodiments, the structure of the rotational position changing mechanism 60 may be changed as long as the structure causes the seat 21, 121 to integrally rotate relative to the vehicle body 22. For example, a rotational position changing mechanism may be used that includes a rack provided on the inner peripheral surface of the support portion 61 and a pinion rotatably provided on the base portion 40 to mesh with the rack.

In each of the embodiments, a manually operated type may be provided as the rotational position changing mechanism 60.

In each of the embodiments, the rotational position changing mechanism 60 may be omitted.

The position controlling device according to each of the embodiments can also be used as a position controlling device for a mobile object other than an automobile, such as a position controlling device for controlling the position of a seat provided in a wheelchair and a position controlling device for controlling the position of a loading platform provided in an automatic guided vehicle.

If the position controlling device according to each of the embodiments is used in a wheelchair, the position of the seat (specifically, the loading portion thereof) and thus the position of the user seated on the seat are stabilized.

Figure 12:
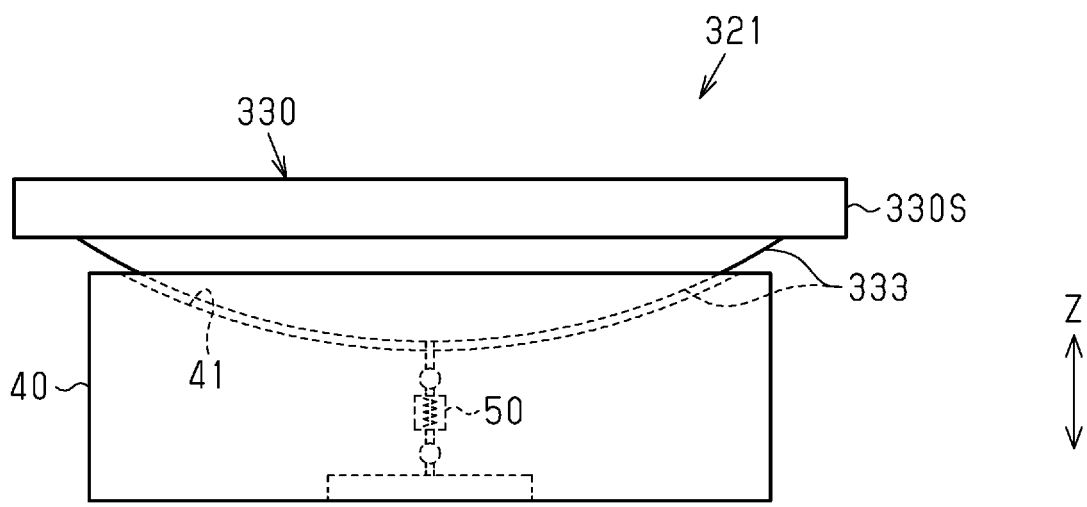
FIG. 12 is a schematic diagram showing the structure of a loading platform with which a position controlling device according to yet another embodiment is used.

FIG. 12 illustrates an example of the structure of a loading platform in a case in which the position controlling device according to each of the embodiments is used in an automatic guided vehicle. As shown in FIG. 12, a loading platform 321 includes a base portion 40 and a loading portion 330. An upper part of the loading portion 330 is a flat plate portion 330S having a flat plate shape. A lower part of the loading portion 330 is a lower convex portion 333, which has a spherical outer surface. The loading portion 330 is provided on the upper part of the base portion 40 such that the outer surface of the lower convex portion 333 of the loading portion 330 and the inner surface of the upper concave portion 41 of the base unit 40 face each other. With this configuration, the shock acting on the loading portion 330 is reduced, the position of the loading portion 330 and thus the position of the cargo loaded on the loading portion 330 are stabilized.

Although the multiple embodiments have been described herein, it will be clear to those skilled in the art that the present disclosure may be embodied in different specific forms without departing from the spirit of the disclosure. The disclosure is not to be limited to the details given herein, but may be modified within the scope and equivalence of the appended claims.

What is claimed is:

1. A position controlling device configured to control a position of a loading platform provided in a mobile object, wherein
    the loading platform includes:
        a loading portion that includes a portion capable of being loaded with a loaded object;
        a base portion that is provided below the loading portion in a manner of supporting the loading portion; and
        a coupling portion that includes a restoring member, the restoring member generating a restoring force for restoring the coupling portion to its original length when the coupling portion is extended, the coupling portion coupling the base portion and the loading portion to each other with the restoring member between the base portion and the loading portion,
    the loading portion and the base portion are provided such that a lower part of the loading portion and an upper part of the base portion face each other, and
    one of the upper part of the base portion and the lower part of the loading portion includes a spherical surface that is convex downward, and the other one of the upper part of the base portion and the lower part of the loading portion includes a guide portion, the guide portion guiding the base portion and the loading portion such that the base portion and the loading portion are movable relative to each other in a direction along the spherical surface, wherein
    the mobile object is a vehicle,
    the loading platform is a seat configured to allow an occupant to sit thereon,
    the seat includes a seat portion, on which the occupant is configured to sit down, and a backrest portion, against which the occupant is configured to rest their back,
    the loading portion includes the seat portion and the backrest portion,
    the position controlling device comprises a coupling position changing mechanism configured to change at least one of a coupling position at which the coupling portion is coupled to the base portion and a coupling position at which the coupling portion is coupled to the loading portion,
    the coupling position changing mechanism includes a rack and a pinion that meshes with the rack, and at least a part of the rack is provided on a back surface of the backrest portion.

2. The position controlling device according to claim 1, wherein the rack extends in a front-rear direction of the seat.

3. The position controlling device according to claim 1, wherein
the loading portion includes a receiving hole having a bottom surface, the receiving hole extending from a lower surface of the seat portion to the back surface of the backrest portion, and
at least a part of the rack is provided on a part of the bottom surface, the part of the bottom surface forming a part of the back surface of the backrest portion.

4. A position controlling device configured to control a position of a loading platform provided in a mobile object, wherein
the loading platform includes:
a loading portion that includes a portion capable of being loaded with a loaded object;
a base portion that is provided below the loading portion in a manner of supporting the loading portion; and
a coupling portion that includes a restoring member, the restoring member generating a restoring force for restoring the coupling portion to its original length when the coupling portion is extended, the coupling portion coupling the base portion and the loading portion to each other with the restoring member between the base portion and the loading portion,
the loading portion and the base portion are provided such that a lower part of the loading portion and an upper part of the base portion face each other, and
one of the upper part of the base portion and the lower part of the loading portion includes a spherical surface that is convex downward, and the other one of the upper part of the base portion and the lower part of the loading portion includes a guide portion, the guide portion guiding the base portion and the loading portion such that the base portion and the loading portion are movable relative to each other in a direction along the spherical surface, wherein
the position controlling device further comprises:
an acquisition unit that is configured to acquire information regarding a moving state of the mobile object;
a relative position changing mechanism that is, when a direction in which the base portion and the loading portion are arranged is defined as a first direction, provided to form a middle part of the coupling portion in the first direction, and configured to operate to displace a part closer to the base portion and a part closer to the loading portion from each other in a second direction that intersects the first direction;
a drive unit that is coupled to the relative position changing mechanism and is configured to drive the relative position changing mechanism; and
a control unit that is configured to control an operation of the drive unit based on the information acquired by the acquisition unit,
the base portion includes a coupling recess having a bottom wall, the relative position changing mechanism includes a guide rail and a guide table,
the guide rail is provided on the bottom wall of the coupling recess so as to extend in the second direction, and
the guide table is attached to the bottom wall with the guide rail between the bottom wall and the guide table.

5. The position controlling device according to claim 4, wherein
the mobile object is a vehicle, and
the loading platform is a seat.

6. A position controlling device configured to control a position of a loading platform provided in a mobile object, wherein
the loading platform includes:
a loading portion that includes a portion capable of being loaded with a loaded object;
a base portion that is provided below the loading portion in a manner of supporting the loading portion; and
a coupling portion that includes a restoring member, the restoring member generating a restoring force for restoring the coupling portion to its original length when the coupling portion is extended, the coupling portion coupling the base portion and the loading portion to each other with the restoring member between the base portion and the loading portion,
the loading portion and the base portion are provided such that a lower part of the loading portion and an upper part of the base portion face each other, and
one of the upper part of the base portion and the lower part of the loading portion includes a spherical surface that is convex downward, and the other one of the upper part of the base portion and the lower part of the loading portion includes a guide portion, the guide portion guiding the base portion and the loading portion such that the base portion and the loading portion are movable relative to each other in a direction along the spherical surface, wherein
the position controlling device further comprises a rotational position changing mechanism that is configured to cause the loading portion, the base portion and the coupling portion to integrally rotate relative to a main body of the mobile object about a rotation axis extending in a first direction in which the base portion and the loading portion are arranged.

7. The position controlling device according to claim 6, wherein
the mobile object is a vehicle, and
the loading platform is a seat.

8. The position controlling device according to claim 6, wherein the rotational position changing mechanism includes a rack and a pinion that meshes with the rack, the rack being provided on the base portion.

* * * * *